United States Patent [19]

Yabuta et al.

[11] 4,330,785
[45] May 18, 1982

[54] THERMAL RECORDING METHOD

[75] Inventors: Kenji Yabuta, Funabashi; Senji Tosa; Yasuhiko Oiri, both of Tokyo; Chihaya Tanaka, Isehara, all of Japan

[73] Assignees: Mitsubishi Paper Mills, Ltd.; Nippon Hoso Kyokai, both of Tokyo, Japan

[21] Appl. No.: 235,721

[22] Filed: Feb. 18, 1981

[30] Foreign Application Priority Data

Feb. 19, 1980 [JP] Japan .................................. 55-19416
Jun. 13, 1980 [JP] Japan .................................. 55-79938

[51] Int. Cl.³ ..................... G01D 15/10; G01D 15/34
[52] U.S. Cl. .................................. 346/1.1; 346/76 R; 346/135.1; 250/316.1
[58] Field of Search ............... 346/1.1, 76 R, 76 PH, 346/76 L, 135.1; 250/316.1, 317.1, 318; 358/296–299, 303; 430/258, 964, 348–350

[56] References Cited

U.S. PATENT DOCUMENTS

| | | | |
|---|---|---|---|
| 2,868,124 | 1/1959 | Crawford | 346/76 R |
| 3,315,598 | 4/1967 | Owen | 250/318 X |
| 3,392,020 | 7/1968 | Yutzy et al. | 250/317.1 |
| 3,787,873 | 1/1974 | Sato et al. | 346/135.1 X |

Primary Examiner—Joseph W. Hartary
Assistant Examiner—W. J. Brady
Attorney, Agent, or Firm—Cushman, Darby & Cushman

[57] ABSTRACT

This invention relates to a thermosensitive recording system whereby recording is performed by thermal means, more specifically a thermal recording method which is capable of transmitting or recording concavo-convex stereo information by using in combination a thermosensitive stereo recording material principally composed of thermo-expandable microspheres and a thermorecording medium having a thermoplastic ink coating layer.

6 Claims, 4 Drawing Figures

THERMAL RECORDING METHOD

BACKGROUND OF THE INVENTION

1. Field of the Invention

This invention relates to a thermosensitive stereo recording method, and more particularly it relates to such thermal recording method which is capable of transmitting or recording stereo information with cancavo-convexities by using in combination a thermosensitive stereo recording material having a coating layer mainly composed of heat-expandable microspheres and a thermo-recording medium applied with a thermoplastic ink coating layer.

2. Description of the Prior Art

Thermosensitive recording, which is a recording method devised to form the images by making use of the physical or chemical changes of a substance by means of thermal energy, has prevailed widely in the field of information science. For instance, it has been applied to output recording in electronic computing machines and signal receiving and recording by facsimiles, let alone application to copying of documents, owing to its various advantageous features such as no noise during recording and adoption of a color forming system which requires no development and fixing. Particularly, an amazing advancement has been seen lately in its adaptation to the printers, plotters, facsimiles and such in order to meet the request of the society in recent years for treatment of a huge volume of information as hard copies at the highest possible output performance.

A variety of methods have been devised for the preparation and application of thermosensitive material. There is known, for example, a thermosensitive material prepared by applying a color pigment or dye or powder of other like material such as carbon on a substrate and further applying thereon a white opaque thermofusible substance. There are also known a color-developing method by formation of a complex compound of an electron donor and an acceptor and a color recording method in which a crystal violet lactone and a phenolic acidic material are dispersed in a binder such as polyvinyl alcohol and the dispersion is heated to develop color.

However, any of the heretofore proposed thermosensitive recording means such as mentioned above is ineffective for recording of concavo-convex stereo information.

The present invention has for its object to provide a thermosensitive stereo recording method which is capable of recording concavo-convex stereo information, such as braille for the blind, by combined use of a thermal recording device such as a printer or facsimile which is capable of converting electric information into thermal information and an exposure device.

Other and further objects, features and advantages of the invention will appear more fully from the following description.

SUMMARY OF THE INVENTION

The said object of this invention can be accomplished by a thermosensitive stereo recording method of this invention according to which a thermosensitive stereo recording material obtained by forming a coating layer principally composed of heat-expandable microspheres on the surface of a support and a thermo-recording medium formed by coating the surface of a substrate with a thermoplastic ink layer are placed one upon the other such that their respective coating layers oppose to each other, then, if necessary, after press-bonding them integral to each other by a press roll device such as a calender or laminator, the thermoplastic ink coating layer is transferred onto the coating layer of said thermosensitive stereo recording material by a thermal recording device and, after removing said thermo-recording medium, the entire surface of the coating layer of said thermosensitive stereo recording material is exposed by an exposure means to obtain a concavo-convex image.

DETAILED DESCRIPTION OF THE INVENTION

The thermosensitive stereo recording method according to this invention is described hereinbelow with reference to the accompanying drawings.

Figure 1:
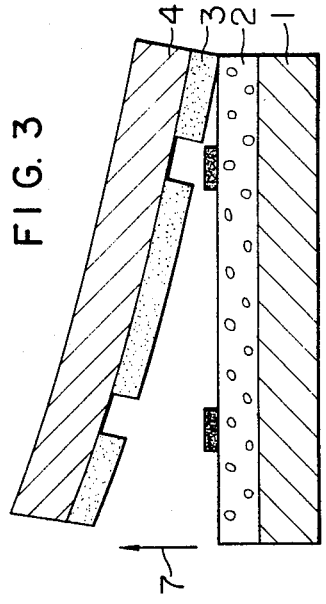
FIG. 1 is a schematic enlarged partial sectional view showing a condition in which a thermosensitive stereo recording material formed by coating the surface of a support with a layer principally composed of heat-expandable microspheres and a thermo-recording medium formed by coating the surface of a substrate with a thermoplastic ink layer are placed one upon the other such that their respective coating layers contact each other.
Figure 2:
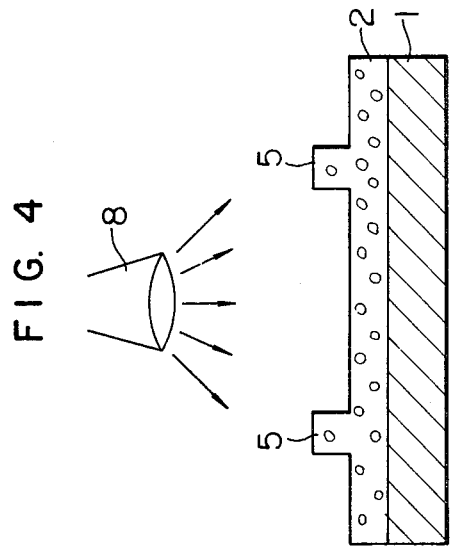
FIG. 2 is a schematic view illustrating a condition in which the thermoplastic ink coating layer has been transferred onto the coating layer principally composed of heat-expandable microspheres according to a thermal information pattern by a thermal recording head.
Figure 3:
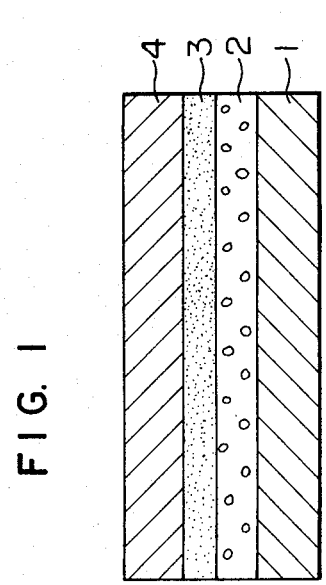
FIG. 3 is a schematic view illustrating a condition in which the thermo-recording medium is being stripped off from the thermosensitive stereo recording material in the condition of FIG. 2.
Figure 4:
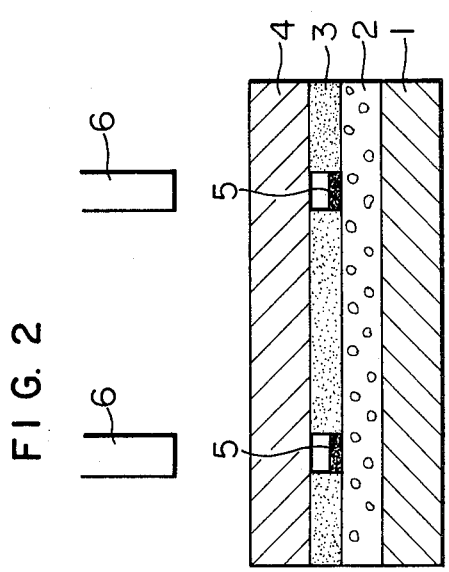
FIG. 4 is a schematic view illustrating a condition in which the image portion alone has been selectively expanded and raised by an exposure device.

FIG. 1 shows a condition in which a thermo-sensitive stereo recording material prepared by providing on the surface of a support 1 a coating layer principally composed of thermo-expandable microspheres and a thermo-recording medium prepared by forming a thermoplastic ink coating layer on the surface of a substrate 4 are placed in contact with each other such that the respective coating layers 2 and 3 oppose to each other. FIG. 2 shows a condition where while maintaining said thermosensitive stereo recording material and said thermo-recording medium in said contacted state, or if necessary, after they had been further press-bonded integral to each other by a press roll device such as a calender or laminator, the thermoplastic ink coating layer 3 has been transferred to the coating layer 2 principally composed of heat-expandable microspheres according to a thermal information pattern by heating said thermoplastic ink coating layer 3 of the substrate 4 from back side thereof by a thermal recording head of a thermosensitive recording facsimile or other like device. FIG. 3 shows a condition in which said thermo-recording medium is being separated away from said thermosensitive stereo recording material, and FIG. 4 shows a condition where the entire surface of the coating layer 2 (principally composed of heat-expandable microspheres) of said thermosensitive stereo recording material has been subjected to uniform strong light irradiation by an exposure means 3 to effect selective heating and expansion of the image portion 5 by dint of difference in light absorption.

Both support 1 and substrate 4 are not subject to any specific restrictions in their material except for the requirement that the material used therefor should have a certain degree of strength, and for example, papers such as common paper, synthetic paper, laminate paper, etc., or resin films such as polyethylene, polystyrene or polypropylene films may be favorably used. As for the substrate, however, a thin-leaf paper such as condenser paper, glassine paper, tracing paper, etc., is most suited for the purpose of this invention as such paper has relatively good heat conductivity because of high density and minimized amount of air trapped in the paper layer. The thermo-expandable coating layer 2 is principally composed of heat-expandable microspheres and a binder for bonding such microspheres to the support 1. Said "heat-expandable microspheres" are the microspheres expanded upon heating, which are commercially available by the tradenames of Saran Microsphere (Dow Chemical), Micropearl (Matsumoto Yushi Seiyaku), etc. Such heat-expandable microsphere is a hollow particle having a diameter of approximately 3 to 200 microns, with its capsule wall being formed from a thermoplastic material such as a vinylidene chloride-acrylonitrile copolymer. This microsphere is substantially spherical in shape and contains in its hollow portion about 5 to 50% by weight of a volatile foaming agent such as n-butane, isobutane, neopentane, etc. Expanding temperature of said heat-expandable microspheres is 50° to 200° C., preferably 100° to 150° C.

The essential requirements for the binder used in this invention are that it has sufficient flexibility or stretchability to form concavo-convexities of a proper height without affecting the expanding property of the microspheres, that it has good adhesion to the support and that it has excellent restoring ability against compression, and if these requirements are met, any type of binders, whether water-soluble type or organic solvent-soluble type, may be used in this invention. Examples of the water-soluble binders useable for the purpose of this invention include the natural or synthetic high-molecular compounds such as gelatin, polyvinyl alcohols, polyethylene glycol, hydroxyethyl cellulose, methoxy cellulose, carboxymethyl cellulose, polyvinyl pyrrolidone, polyacrylamide, polyacrylic acid, etc., and the aqueous polymer emulsions such as polyvinyl acetate emulsion, vinyl acetate-vinyl chloride copolymer emulsion, vinyl acetate-ethylene copolymer emulsion, styrene-butadiene copolymer emulsion, etc.

The organic solvent-soluble type binders usable in this invention include, for example, polyvinyl butylate, polystyrene, polyvinyl chloride, styrene-butadiene copolymer, ethylene-vinyl acetate copolymer, vinyl acetate-vinyl chloride copolymer, polyvinylidene chloride, vinylidene chloride-acrylonitrile copolymer, ethyl cellulose, nitrocellulose, polyvinyl acetate, saturated polyester resin, epoxy resin, silicon resin, alkyd resin, etc.

The essential ingredients of the composition of this invention are those named above. Among them, the heat-expandable microspheres are used in an amount of approximately 10–300 parts by weight, preferably approximately 70–200 parts by weight, for every 100 parts by weight of the binder composition. The binder may contain, beside said heat-expandable microspheres, a suitable additive or additives, for example a viscosity modifier (such as starch, natural gum, ethyl cellulose, carboxymethyl cellulose, etc.). It is also possible to blend an inorganic filler such as talc, kaolin, zinc oxide, titanium oxide, calcium carbonate, silicon dioxide, etc., for improving whiteness.

The most preferred build-up of the heat-expandable microspheres is within the range of 5 to 50 $g/m^2$ for the reasons of sensory perceptibility of the concavo-convex images and wear resistance against rubbing by the finger, etc.

The thermo-recording medium obtained by providing a thermoplastic ink coating layer 3 on a substrate 4 is of the known type in which, as for example shown in Japanese Patent Publication No. 43787/1976 and Japanese Patent Laid-Open Nos. 115229/1977 and 84735/1978, the ink coating layer of said recording medium is fused by thermal energy of a thermosensitive recording facsimile, printer, etc., and transferred onto a recording paper placed in opposition to said ink coating layer to thereby effect recording.

A salient advantage of this invention resides in the fact that the device is capable of high-speed transmittance and recording of concavo-convex stereo information by using only a simple exposure means beside an ordinary thermosensitive recording facsimile that allows high-speed transmittance of a large volume of information, owing to use of a specific recording material consisting of said thermo-recording medium and a thermosensitive stereo recording material formed by providing a coating layer principally composed of heat-expandable microspheres on the surface of a support, said both recording members being attached to each other with their respective coating layers opposing to each other and, if necessary, press-bonded integral to each other by using a press roll device such as a calender or laminator.

In order to facilitate better understanding of the effect of this invention, the device of this invention is further described hereinbelow by way of the embodiments thereof.

EXAMPLE 1

(A) Preparation of thermosensitive stereo recording material 1 kg of an emulsion containing a vinyl acetate-acrylic ester copolymer resin (50% by weight) was put into a stainless beaker, and then net 500 g solids of Micropearl F-30 (10–30μ encapsulized fine particles made by encapsulizing isobutane-based low-boiling hydrocarbon with a vinylidene chloride-acrylonitrile copolymer resin) mfd. by Matsumoto Yushi Seiyaku KK was added portionwise as the thermo-expandable microspheres into said emulsion under stirring to form a uniform slurry.

This slurry was then added with 1 g of methyl cellulose as thickener and stirred well. The thus prepared thermosensitive composition was applied on a fine-quality paper by a wire bar and then dried to obtain a recording paper. The coating weight after drying was 46 $g/m^2$.

(B) Formation of light absorption pattern

A thermosensitive stereo recording material prepared according to the above-said method (A) and a thermo-recording medium prepared by coating a fine-quality paper with carbon black and a thermoplastic ink layer by hot-melt coating were attached to each other such that their respective coated surfaces opposed to each other, then the laminate was heated from the opposite side of the coated surface of said thermo-recording medium by a thermal recording head such as a thin-film head using a thin-film resistor of tantalum nitride, which is commercially sold as a unit for thermosensitive recording facsimiles, and said thermo-recording medium was stripped off from said thermosensitive stereo recording material to thereby form a light absorption pattern principally composed of carbon black and a thermoplastic wax on a thermo-expandable layer applied on the surface of said thermosensitive stereo recording material.

(C) Formation of concavo-convex stereo image

The surface of said thermosensitive stereo recording material was subjected to uniform and strong infrared irradiation to selectively heat and expand the image portion owing to the difference in light absorption to obtain a concavo-convex image corresponding to the light absorption pattern. The height of the concavo-convexities measured by a surface roughness meter (mfd. by Tokyo Seimitsu) was 0.31 mm.

EXAMPLE 2

Transmittance and recording of braille information, etc., by facsimile

Images such as writings in braille are drawn in black on a common paper as the original of information to be transmitted and the drawing is converted into an electrical scanning signal (facsimile signal) and transmitted by a facsimile transmitter. The signal is received by a thermosensitive recording type facsimile receiver and scanned by adding a thermal signal corresponding to the facsimile signal on the thermo-recording medium side of a facsimile recording paper composed of said thermo-recording medium and thermosensitive stereo recording material, thereby developing the received image. Then the thermo-recording medium is separated from the thermosensitive stereo recording material to transfer the image onto said thermosensitive stereo recording material. Then uniform heat rays are applied to the thermosensitive stereo recording material to which said image has been transferred, whereupon the image portion is heated and expanded to rise up owing to the difference in light absorption between the colored (black) image portion and the ground (white) and is thereby recorded as a concave-convex braille writing.

As described above, the present invention has enabled easy transmission and recording of concave-convex stereo information like braille for the blind by the electrical communication means by making use of a heat-expandable thermosensitive recording paper, a thermo-sensitive recording facsimile and a simple exposure means.

What is claimed is:

1. A thermosensitive stereo recording method in which a thermosensitive stereo recording material prepared by coating the surface of a support with a layer principally composed of thermo-expandable microspheres and a thermo-recording medium prepared by forming a thermoplastic ink coating layer on the surface of a substrate are attached to each other such that their respective coating layers oppose to each other, then, if necessary, after press-bonding them integrally to each other by using a press roll device such as a calender or laminator, said thermoplastic ink coating layer is transferred onto the coating layer of said thermosensitive stereo recording material by a thermal recording device, and after stripping off said thermo-recording medium, the entire surface of the coating layer of said thermosensitive stereo recording material is exposed by an exposure means to thereby obtain a concavo-convex image.

2. The thermosensitive stereo recording method according to claim 1, wherein the thermo-expandable microspheres are the hollow particles encapsulized with a thermoplastic material, said particles containing therein a volatile low-boiling point substance.

3. The thermosensitive stereo recording method according to claim 2, wherein the thermoplastic material is a vinylidene chloride-acrylonitrile copolymer.

4. The thermosensitive stereo recording method according to claim 2, wherein the volatile low-boiling point substance is n-butane, isobutane, neopentane or petroleum ether.

5. The thermosensitive stereo recording method according to claim 1, wherein the thermoplastic ink coating layer is a layer formed from a color pigment or color dye and a thermoplastic binder or the like, and the thermo-expandable microspheres are heated and expanded as said color pigment or dye absorbs light to generate heat under strong light irradiation.

6. The thermosensitive stereo recording method according to claim 1, wherein the thermosensitive recording device is a thermal recording facsimile.

* * * * *